United States Patent Office 3,454,662
Patented July 8, 1969

3,454,662
3,3-DICHLOROPROPYNE
Charles E. Lyons, Midland, Mich., assignor to The Dow Chemical Company, Midland, Mich., a corporation of Delaware
No Drawing. Filed Aug. 28, 1967, Ser. No. 663,551
Int. Cl. C07c *17/18, 21/22*
U.S. Cl. 260—654      2 Claims

ABSTRACT OF THE DISCLOSURE

A new compound, 3,3-dichloropropyne, and its method of preparation, which comprises slowly adding propiolaldehyde to phosphorus pentachloride and mixing. Then water is added, and the desired product distilled.

Background of the invention

U.S.P. No. 2,950,330 teaches an isomeric compound, 1,3-dichloropropyne, its method of preparation and its use as a soil fumigant.

Summary of the invention

The compound of the invention, 3,3-dichloropropyne, is conveniently prepared from propiolaldehyde by reaction with phosphorus pentachloride. It is biologically active, particularly as an insecticide.

Specific embodiment

Propiolaldehyde is added dropwise into an ice-cooled stirred flask containing at least about an equimolar amount of phosphorus pentachloride. After the addition is completed, the cooling agent is removed and the reaction mixture allowed to stir at about room temperature overnight. Excess water is then added dropwise while the outside of the flask is cooled to maintain a temperature slightly above room temperature during the time required for the water addition. The resulting mixture is then distilled and the distillate boiling up to about 105° C. collected. This is then washed several times with water, dried over a suitable desiccant and distilled to yield 3,3-dichloropropyne.

3,3-dichloropropyne is a colorless, stable liquid with a boiling point of approximately 83° C. It is soluble in acetone and ethyl alcohol but only slightly soluble in water.

As compared to the known isomer, 3,3-dichloropropyne shows remarkable and unexpected properties as an insecticide. 1,3-dichloropropyne and 3,3-dichloropropyne were tested identically, as summarized in the table below, to point out these unexpected results.

Tests 1 and 2 were carried out in the following manner:
Each of the two compounds was emulsified in water at a concentration of 0.05%. The insects were inactivated with carbon dioxide and then immersed in the two solutions. After contact, they were fed sugar water for three days, and mortality counts were then made.

Test 3 was carried out in the following manner:
Each of the two compounds was diluted with water to result in a concentration of 0.0002%. The insects were then exposed to the two compounds by putting them into said solutions for 24 hours each. Then mortality counts were made.

The table below summarizes the results of the tests comparing these two isomers:

TABLE

| Test | Concentration[1] percent of isomer | Effectiveness, percent [2] | |
|---|---|---|---|
| | | 1,3- | 3,3- |
| (1) House fly | .05 | -0- | 75 |
| (2) American cockroach | .05 | -0- | 95 |
| (3) Daphnia | .0002 | -0- | 100 |

[1] This is the percent by weight of each isomer used in relation to the inert carrier.
[2] Effectiveness is expressed as a percent of the organisms killed.

I claim:
1. 3,3-dichloropropyne.
2. The process of preparing the compound of claim 1, which comprises reacting by contacting propiolaldehyde with at least an equimolar amount of phosphorus pentachloride.

References Cited

UNITED STATES PATENTS 3,018,218   1/1962   Duggins  ---------- 260—654 X

BERNARD HELFIN, *Primary Examiner.*

J. BOSKA, *Assistant Examiner.*